(12) United States Patent
Archer et al.

(10) Patent No.: US 7,909,343 B2
(45) Date of Patent: *Mar. 22, 2011

(54) MUDFLAP ASSEMBLY

(75) Inventors: David Archer, Orion, MI (US); John W. Howard, Hendersonville, TN (US); Douglas L. Henson, Hendersonville, TN (US); Larry D. Birch, Gallatin, TN (US)

(73) Assignee: Fontaine Spray Suppression Co., Springfield, TN (US)

( * ) Notice: Subject to any disclaimer, the term of this patent is extended or adjusted under 35 U.S.C. 154(b) by 105 days.

This patent is subject to a terminal disclaimer.

(21) Appl. No.: 12/025,576

(22) Filed: Feb. 4, 2008

(65) Prior Publication Data
US 2008/0185810 A1  Aug. 7, 2008

Related U.S. Application Data

(60) Provisional application No. 60/887,940, filed on Feb. 2, 2007.

(51) Int. Cl.
*B62D 25/18* (2006.01)
(52) U.S. Cl. ........................................ 280/154; 280/847
(58) Field of Classification Search .................. 280/847, 280/848, 153.5, 154, 849, 850
See application file for complete search history.

(56) References Cited

U.S. PATENT DOCUMENTS

| 2,471,342 | A | * | 5/1949 | Nelson ..................... 248/289.11 |
| 2,970,849 | A | | 2/1961 | Betts |
| 3,401,953 | A | | 9/1968 | Prohl et al. |
| 3,782,757 | A | | 1/1974 | Juergens |
| 3,940,165 | A | * | 2/1976 | Sogoian ........................ 280/851 |
| 3,954,281 | A | | 5/1976 | Juergens |
| 4,189,165 | A | * | 2/1980 | Leonard et al. ............... 280/851 |
| 4,352,502 | A | * | 10/1982 | Leonard et al. ............... 280/851 |
| 4,613,215 | A | * | 9/1986 | Ayton ........................... 248/561 |
| 6,164,804 | A | * | 12/2000 | Self ............................. 362/485 |
| 6,443,492 | B1 | * | 9/2002 | Barr et al. ..................... 280/851 |
| 6,484,984 | B2 | * | 11/2002 | Hawes ..................... 248/220.21 |
| 6,604,724 | B2 | | 8/2003 | Hawes et al. |
| 6,915,757 | B2 | * | 7/2005 | Urban et al. ................... 116/173 |
| 7,261,272 | B2 | * | 8/2007 | Courbon ..................... 248/475.1 |
| 2008/0100052 | A1 | * | 5/2008 | Oberholtzer et al. .......... 280/848 |

* cited by examiner

*Primary Examiner* — J. Allen Shriver, II
*Assistant Examiner* — John D Walters
(74) *Attorney, Agent, or Firm* — Ann I. Dennen; J. Mark Bledsoe; Lanier Ford Shaver & Payne, P.C.

(57) ABSTRACT

A mudflap assembly comprising a bracket for connection to a vehicle and a hanger extended therefrom. A mudflap is connected to one end of the hanger, while the bracket rotatable receives the other end and maintains the hanger in an initial resting position until the hanger is acted upon by a sufficient horizontal force. A bulge or detent on the bracket resists horizontal movement of the hanger.

11 Claims, 7 Drawing Sheets

MUDFLAP ASSEMBLY

REFERENCE TO RELATED APPLICATIONS

This application claims priority to U.S. Patent Application Ser. No. 60/887,940, entitled "Ramping Mudflap Assembly," filed on Feb. 2, 2007, which is fully incorporated herein by reference.

FIELD OF THE INVENTION

The present disclosure relates generally to the field of spray suppression in commercial trucking. In particular, the present disclosure relates to a mudflap assembly.

BACKGROUND OF THE INVENTION

Mudguards or mudflaps are used primarily behind single or dual rear-wheeled truck and trailer vehicles, particularly heavy duty class 6, 7, and 8. Typically, the mudflap assemblies have the ability to flex in horizontal and vertical directions in order to withstand forces placed upon them during normal operation. Some mudguard mounting structures comprise a single piece of spring-like bar stock bent in a shape for supporting the mudguards and for flexing in all directions.

Other mounting assemblies for mudflaps use a rigid hanger assembly and resiliently bias the hanger assembly to a seat which is attached to a vehicle. In such assemblies, devices are often provided for restraining rotational movement of the hanger assembly with respect to the seat so that the mudflap always remains in its vertical orientation. If the hanger rotates so that the flap moves toward the wheels, the wheels may prematurely wear the mudflap away. If the hanger rotates in an opposite direction, the effectiveness of the mudflap may be diminished.

Mudflap brackets having a horizontal tube with a longitudinal mudflap mounting flange on its underside are known. Such brackets comprise a vehicle frame-mounted plate having bolts or studs of a predetermined, fixed separation, often selected to match existing manufacturer provided apertures in the vehicle frame. A proximate end of the horizontal tube is held against the frame-mounted plate, generally in an abutting relationship, by the bias of an elongate spring residing in the tube, the spring connected at one end to the frame-mounted plate and at the other end to the tube, at a location on the tube distal from the vehicle frame.

The abutting relationship of the horizontal tube and mounting plate to the frame-mounted plate may result in misalignment of the tube, which occurs when the tube is struck or subjected to the forces experienced by the vehicle traveling down the road. The bias of the elongate spring may not overcome the misalignment by itself. Corners or edges between the mounting plate, or tube, and the frame-mounted plate catch or hang up on each other, preventing realignment of the tube. Furthermore, such devices can be expensive to manufacture and replace, and are difficult to install and assemble.

SUMMARY OF THE INVENTION

The present disclosure is directed to a mudflap assembly device. This is accomplished by providing a mudflap hanger and a mudflap bracket.

For purposes of summarizing the disclosure, certain aspects, advantages, and novel features of the disclosure have been described herein. It is to be understood that not necessarily all such advantages may be achieved in accordance with any one particular embodiment of the disclosure. Thus, the disclosure may be embodied or carried out in a manner that achieves or optimizes one advantage or group of advantages as taught herein without necessarily achieving other advantages as may be taught or suggested herein.

The present disclosure discloses a mudflap assembly. The mudflap bracket contains a universal bolting pattern for attachment to any vehicle frame, and can be made from any material such as metal, composites, or high-density plastics which are capable of withstanding normal operational forces. A mudflap hanger is inserted within the bracket leaving the mudflap projecting away therefrom. The mudflap hanger is also made of durable material such as metal, composites, or high-density plastics, capable of withstanding normal operational forces. The mudflap itself is known in the art and made from standard industrial material. The mudflap can either be molded into the mudflap hanger, can be secured to the hanger using traditional means such as bolts or fasteners, or can otherwise be coupled to the hanger through a slot as described below.

In one embodiment, the mudflap hanger is a one-piece molded extension with a first end which couples to the bracket, projecting the other end away therefrom. Along the length of the hanger, is a slot for receiving a mudflap. The top of the mudflap is wedged such that when the bottom of the mudflap is inserted through the top of the hanger through the slot, the wedged portion of the mudflap sets securely within the mudflap slot. The wedge can be preformed into the mudflap, or can be created by mudflap retainers. This is accomplished by providing two halves of a mudflap retainer, wherein each half of the retainer has protrusions which extend through the standard hole placements of the mudflap. The halves are mated together through the mudflap creating a wedge at the top of the mudflap. The mudflap can then be inserted through a slot in a mudflap hanger assembly wherein the wedge created by the retainer couples with the mudflap hanger assembly.

In one embodiment, the bracket is dimensioned to securely clamp one end of the mudflap hanger. The clamping mechanism formed into the bracket at the top and bottom portion of the bracket such that a force causing radial displacement of the mudflap will allow the hanger to rotate until the force is removed whereby the hanger returns to its initial resting position. The clamping mechanism can be provided in several different forms, but generally appears as a bulge or detent located on the top and/or bottom of the bracket. The bulge or detent is either formed into the bracket or attached thereto.

In one embodiment, the end of the hanger which couples with the bracket has substantially cylindrical protrusions on its top and bottom which extend through corresponding openings in the bracket. In this way, when a force displaces the hanger away from its resting, clamped position, the hanger is free to rotate relative to the bracket.

These and other embodiments of the present disclosure will also become readily apparent to those skilled in the art from the following detailed description of the embodiments having reference to the attached figures, the disclosure not being limited to any particular embodiment(s) disclosed.

BRIEF DESCRIPTION OF THE DRAWINGS

The present disclosure is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the present disclosure and their advantages are best understood by referring to FIGS. 1 through 14 of the drawings. The elements of the drawings are not necessarily to scale, emphasis instead being placed upon clearly illustrating the principles of the disclosure. Throughout the drawings, like numerals are used for like and corresponding parts of the various drawings.

Figure 1:
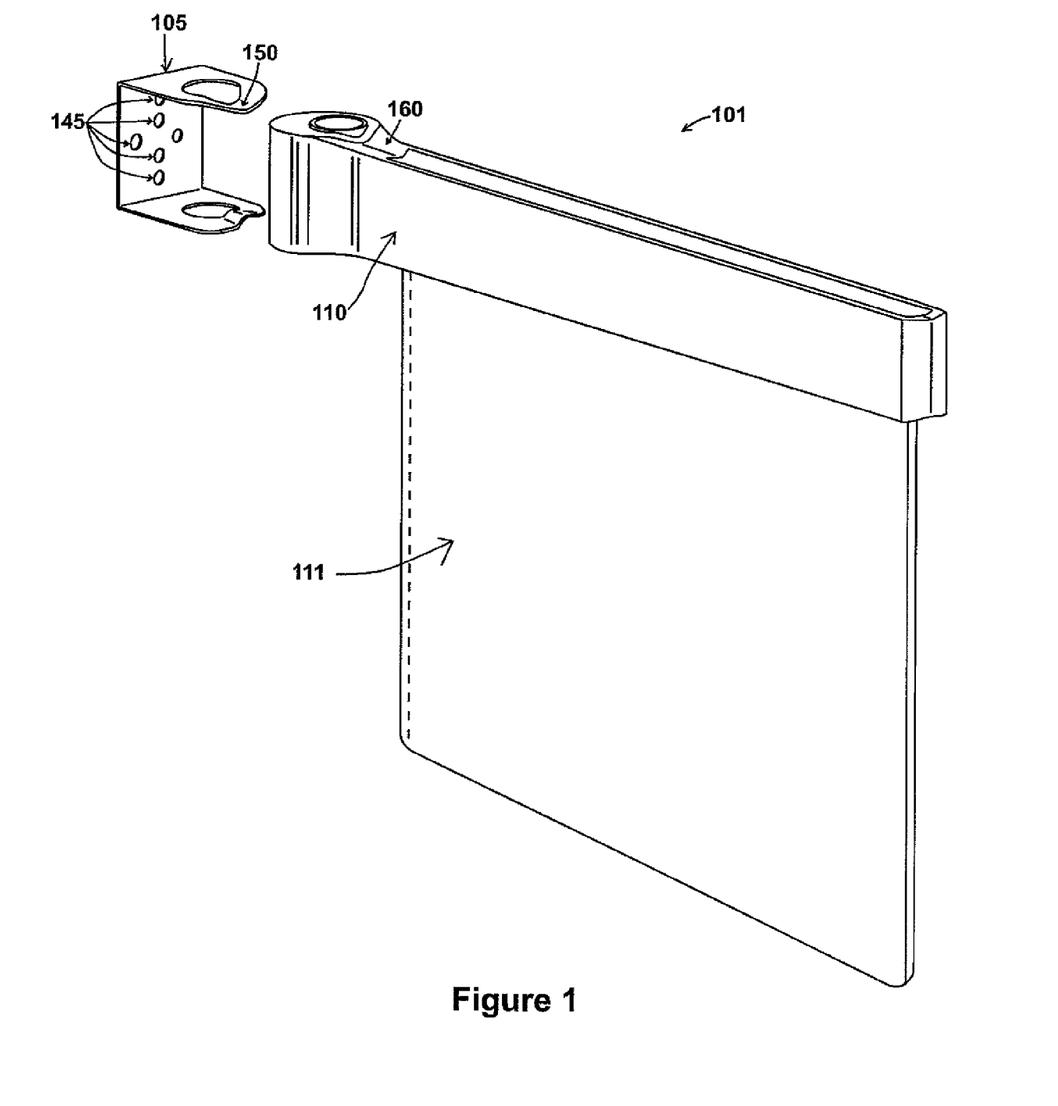
FIG. 1 is an exploded perspective view of an embodiment of the mudflap assembly according to the present invention.
Figure 2:
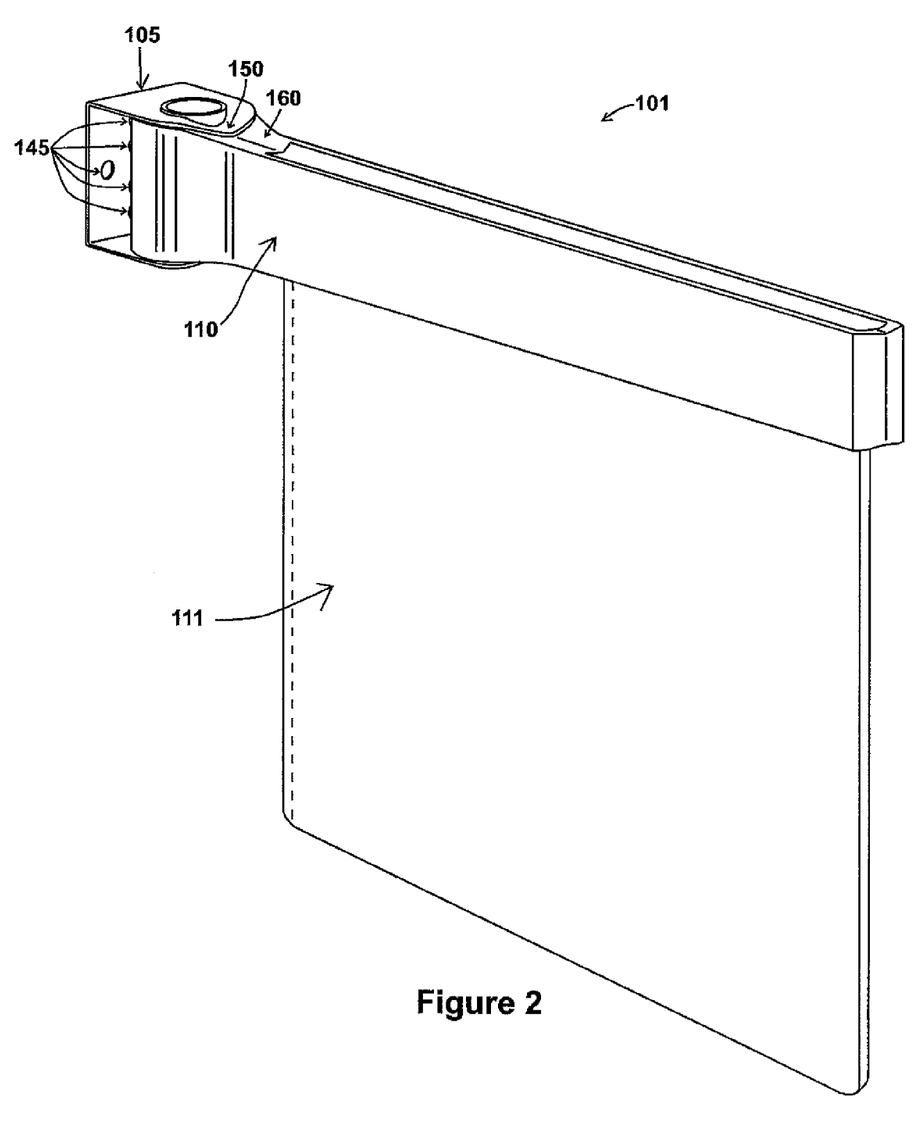
FIG. 2 is a perspective view of the mudflap assembly of FIG. 1 in an assembled configuration.

FIG. 1 illustrates an exploded view of one embodiment of mudflap assembly 101, and FIG. 2 illustrates this embodiment in an assembled configuration. Referring to FIGS. 1 and 2, a hanger 110 is disposed between a bracket 105. A mudflap 111 is attached to the hanger 110. In its resting position, the hanger 110 and bracket 105 fit securely together. A detent 150 of the bracket 105 corresponding with a crevice 160 in the hanger 110 maintains the hanger in its resting position. However, a sufficient horizontal force placed upon the hanger 110 will cause the crevice 160 of the hanger 110 to escape the detent 150 of the bracket 105 allowing the hanger 110 to rotate about the bracket 105.

Figure 3:
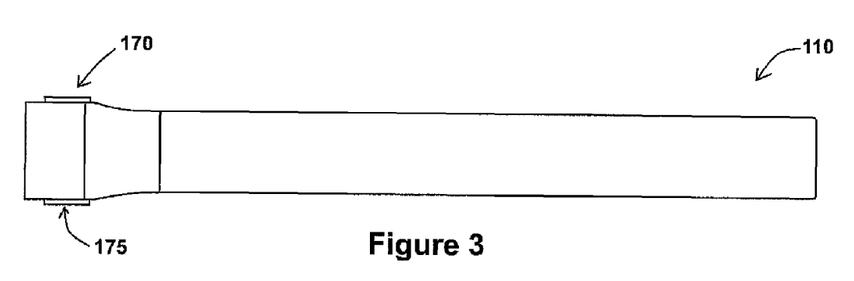
FIG. 3 is a side view of the mudflap hanger of FIG. 1 according to the present disclosure.
Figure 4:
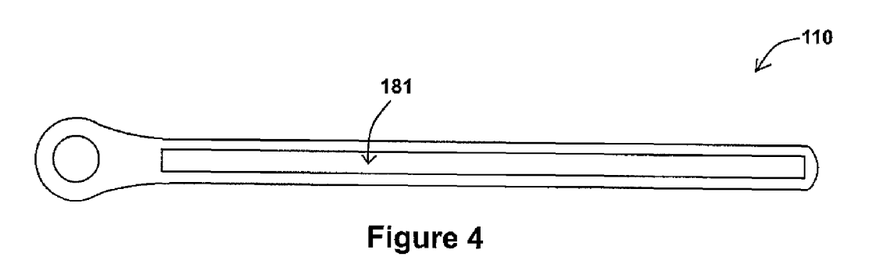
FIG. 4 is a top view of the hanger illustrated in FIG. 3.
Figure 5:
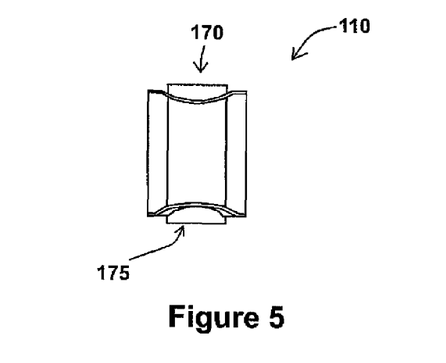
FIG. 5 is a front view of the hanger illustrated in FIG. 3.

FIGS. 3, 4, and 5 are, respectively, side, top and front views of a hanger 110. Two substantially cylindrical protrusions 170, 175 located on the hanger set within two corresponding openings 180, 185 (FIG. 6) of the bracket 105. In one embodiment, a slot 181 may be incorporated into the hanger 110 in order to receive a mudflap (not pictured). In other embodiments, fasteners such as screws and bolts may be used to attach the mudflap to the hanger 110.

Figure 6:
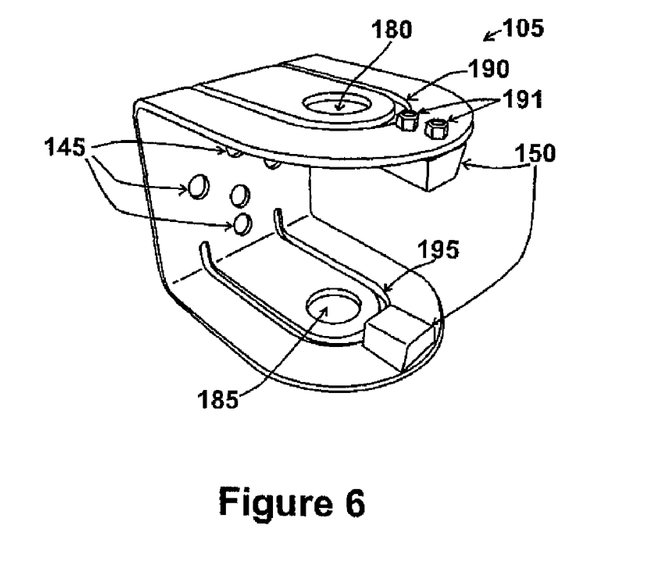
FIG. 6 is a frontal perspective view of the bracket illustrated in FIG. 1.
Figure 7:
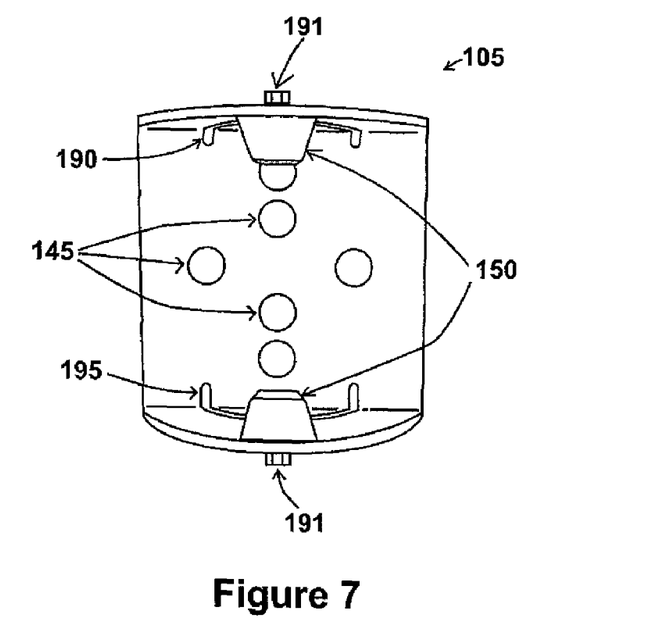
FIG. 7 is a front view of the bracket illustrated in FIG. 6.
Figure 8:
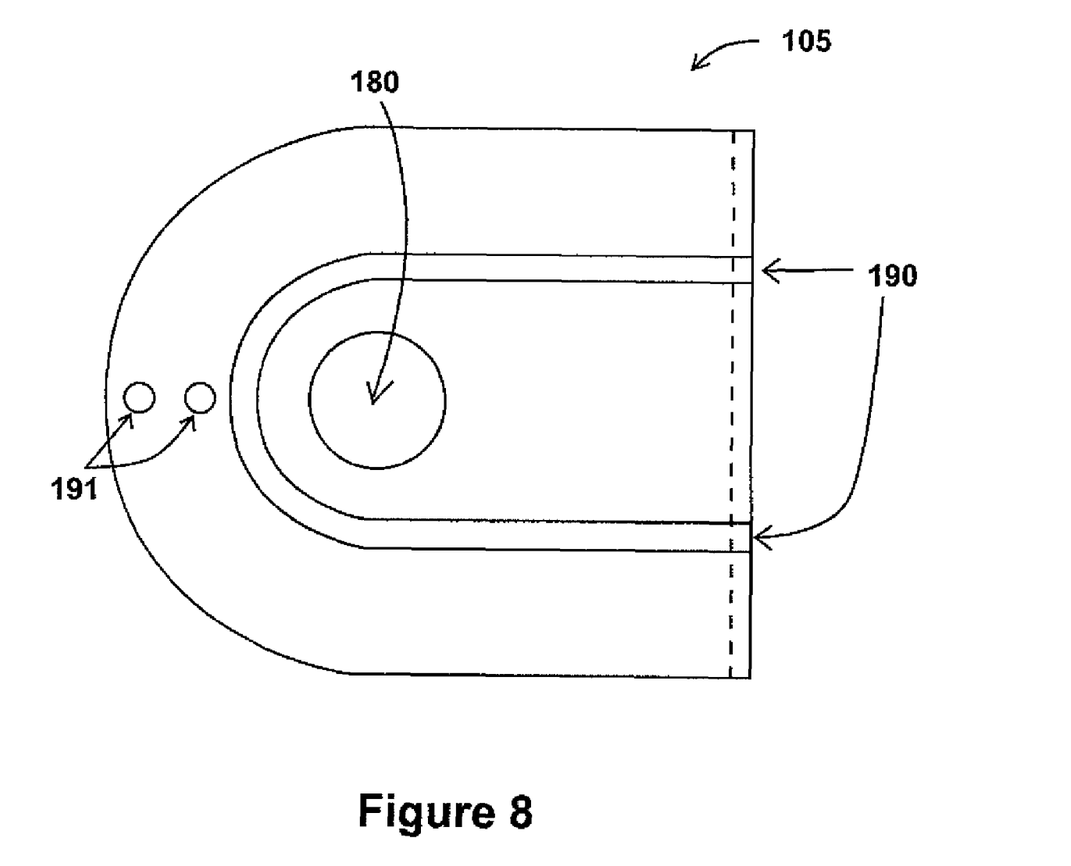
FIG. 8 is a top view of the bracket illustrated in FIG. 6.

FIGS. 6, 7, and 8 are, respectively, perspective, front and top views of a bracket 105 according to the present disclosure. The substantially flat rear surface of the bracket 105 contains openings 145 to allow for the attachment of the bracket 105 to a vehicle (not shown). The openings 145 are illustrated in a universal bolt pattern, but may be provided in any practicable pattern, number, and size. The top and bottom surface of the bracket 105 contain openings 180, 185 which receive the cylindrical protrusions 170, 175 (FIG. 3) of the hanger. A detent 150 is attached to both the top and bottom of the bracket 105 with fasteners 191. When the assembly is in its resting position, the detent 150 of the bracket 105 and the crevice 160 (FIG. 1) of the hanger 110 mate with one another to prevent rotation of the hanger 110 (FIG. 1) within the bracket 105. In one embodiment, U-shaped tabs 190, 195 may be cut into the bracket 105 substantially encircling the openings 180, 185 to allow for easier installation of the hanger 110 (FIG. 1) within the bracket 105.

Figures 9, 10:
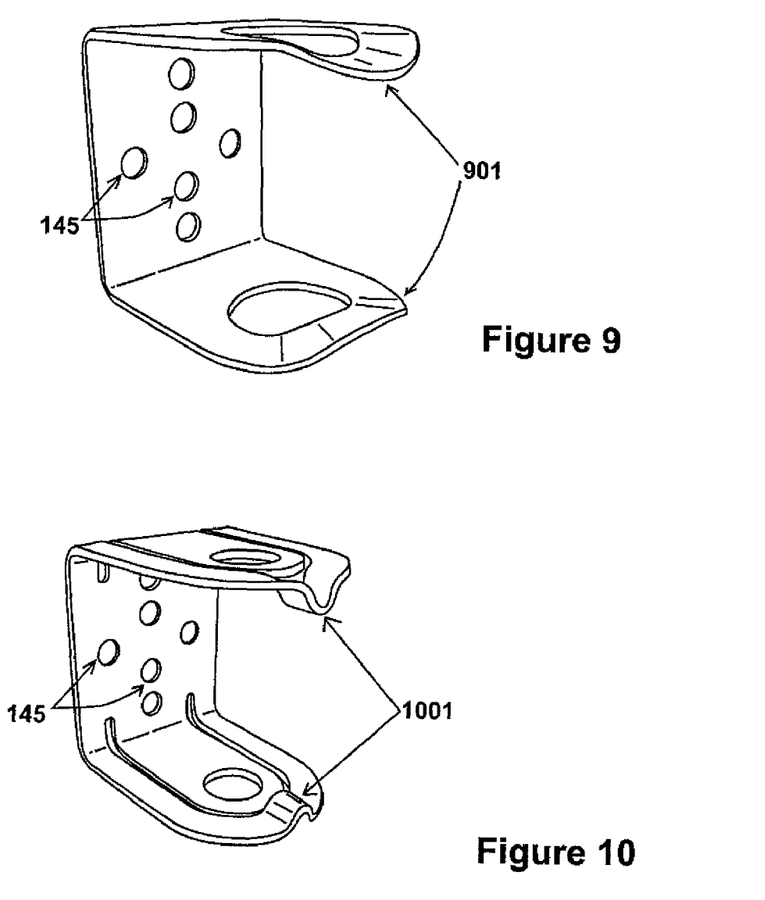
FIG. 9 is a frontal perspective view of an alternative embodiment of the bracket illustrated in FIG. 1.
FIG. 10 is a frontal perspective view of an alternative embodiment of the bracket illustrated in FIG. 1.
Figure 11:
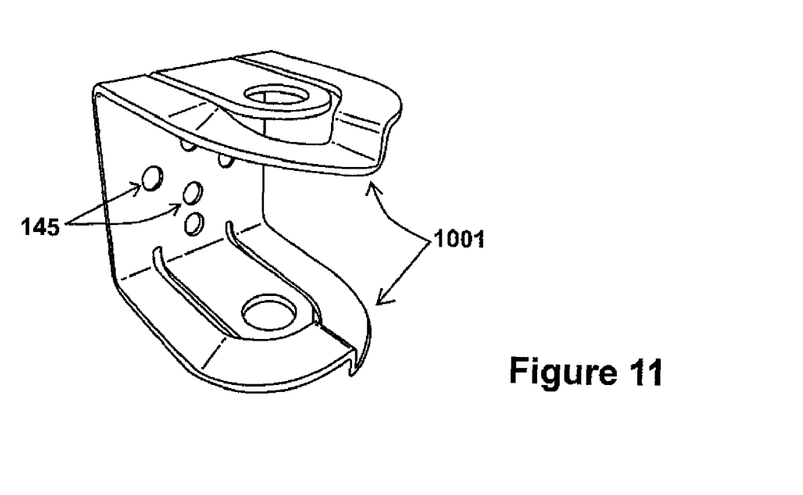
FIG. 11 is a frontal perspective view of an alternative embodiment of the bracket illustrated in FIG. 1.

FIGS. 9, 10, and 11 show alternative embodiments of a bracket 105. Referring to FIG. 9, the bulge 901 is less pronounced than the detent (FIG. 6). Accordingly, a smaller horizontal force will displace the hanger from its initial resting position than the one required to displace the hanger from the bracket depicted in FIG. 6. Referring to FIG. 10, the bulge 1001 is more pronounced than the bulge 901 (FIG. 9). Accordingly, a greater horizontal force will be required to displace the hanger from its initial resting position than the one required to displace the hanger from the bracket depicted in FIG. 9. Similarly, referring to FIG. 11, the bulge 1101 is more pronounced than the bulge 1001 (FIG. 10). Accordingly, a greater horizontal force will be required to displace the hanger from its initial resting position than the one required to displace the hanger from the bracket depicted in FIG. 10.

Figure 12:
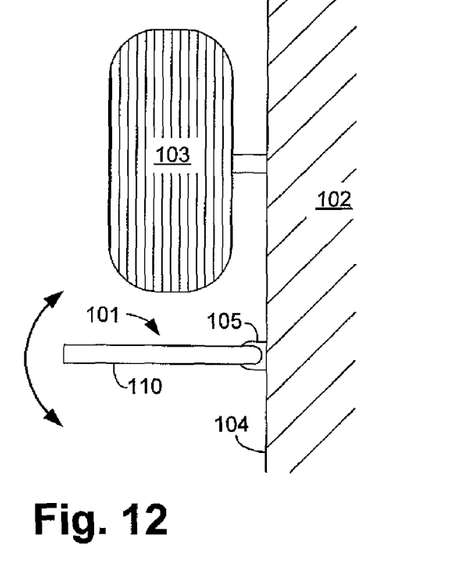
FIG. 12 is a top partial plan view of the mudflap assembly of FIG. 1 in its initial position installed on a vehicle.
Figure 13:
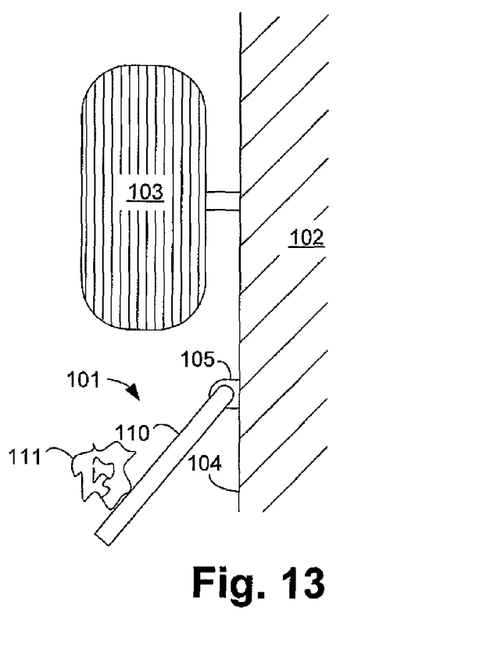
FIG. 13 is a top partial plan view of the mudflap assembly of FIG. 12, illustrated in a position wherein the mudflap is being acted on by a horizontal force.
Figure 14:
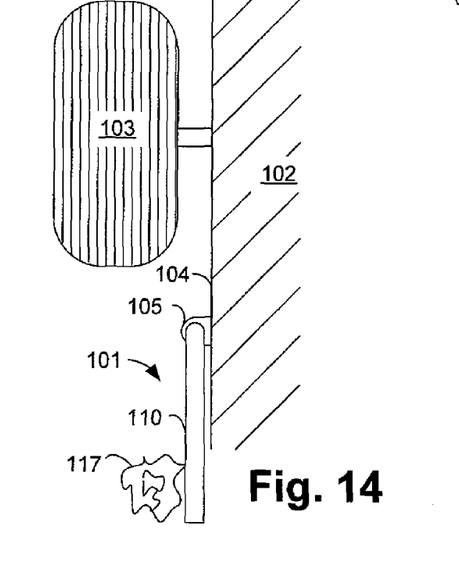
FIG. 14 is a top partial plan view of the mudflap assembly of FIG. 12, wherein the mudflap assembly has been rotated a full 90 degrees from its initial position.

FIGS. 12-14 illustrate the orientation of the mudflap assembly 101 during operation. Specifically, FIG. 12 is a top partial view of a vehicle 102 with a mudflap assembly 101 installed behind a wheel 103, wherein the mudflap assembly 101 is in its initial or "resting" orientation (i.e., when no force has been applied to the mudflap (not shown) or hanger 110 sufficient to move hanger 110 from its starting position perpendicular to the side 104 of the vehicle 102). As illustrated in FIG. 13, upon contact by an obstacle or object 117, hanger 110 may experience sufficient horizontal force to rotate in either a forwards or backwards direction as it swivels within bracket 105. When the force is removed from the hanger 110, the hanger will return to its initial or resting position. FIG. 14 illustrates the hanger 110 after it has rotated a full 90 degrees from its initial position.

This disclosure may be provided in other specific forms and embodiments without departing from the essential characteristics as described herein. The embodiments described above are to be considered in all aspects as illustrative only and not restrictive in any manner. The following claims rather than the foregoing description indicate the scope of the disclosure.

As described above and shown in the associated drawings, the present disclosure comprises a mudflap assembly. While particular embodiments of the disclosure have been described, it will be understood, however, that the disclosure is not limited thereto, since modifications may be made by those skilled in the art, particularly in light of the foregoing teachings. It is, therefore, contemplated by the appended claims to cover any such modifications that incorporate those features or those improvements that embody the spirit and scope of the present disclosure.

What is claimed is:

1. A mudflap assembly comprising:
   a hanger for supporting a mudflap, the hanger comprising a horizontal substantially rectangular portion and a substantially cylindrical portion at a first end of said substantially rectangular portion, said substantially cylindrical portion contiguous with said substantially rectangular portion, said substantially cylindrical portion comprising a first protrusion on a top side of said substantially cylindrical portion and a second protrusion on a bottom side of said substantially cylindrical portion;

a bracket having a vertical substantially flat rear portion and a first and second leg contiguous with the substantially flat rear portion, said first leg extending from a first end of the vertical substantially flat rear portion and said second leg extending from a second end of said vertical substantially flat rear portion, said first leg having a first opening and said second leg having a second opening, said substantially cylindrical portion is rotatably coupled to said bracket wherein said substantially cylindrical portion is inserted between said first leg and said second leg and said first protrusion on said top side of said substantially cylindrical portion fits within said first opening of said first leg and said second protrusion on said bottom side of said substantially cylindrical portion fits within said second opening of said second leg, such that upon impact of said hanger with an obstacle, a second end of said hanger rotates around said bracket, radially displacing said hanger from an initial position and as said hanger rotates, said first protrusion and said second protrusion rotate within said first and second openings, respectively, wherein the first leg comprises a detent, said detent having downwardly sloping sides that terminate at a low point and said hanger has a crevice having downwardly sloping sides that terminate at a low point such that the downwardly sloping sides of said detent slidably move along the downwardly sloping sides of said crevice to displace from the detent from said crevice upon impact of said hanger with an obstacle.

2. The mudflap assembly of claim 1, wherein the first leg and the second leg of said bracket form a cavity for receiving said substantially cylindrical portion of said hanger.

3. The mudflap assembly of claim 2 wherein said substantially cylindrical portion of said hanger further comprises the crevice on said top side of said substantially cylindrical portion, the crevice for receiving said detent when said substantially cylindrical portion is inserted into said cavity.

4. The mudflap assembly of claim 3 wherein said hanger further comprises a slot for receiving said mudflap.

5. A mudflap assembly comprising
a hanger comprising a first end for supporting a mudflap and a second end comprising a first protrusion on a top surface of said second end and a second protrusion on a bottom surface of said second end, the second end further comprising a first crevice positioned adjacent said first protrusion and a second crevice positioned adjacent said second protrusion;
a bracket for connecting to a vehicle and for rotatably receiving said second end of said hanger, said bracket comprising a first opening and a first detent on a top side of the bracket, said first detent having downwardly sloping sides that terminate at a low point, the first detent adapted for being received by said first crevice when said first protrusion is inserted in said first opening, said first crevice having downwardly sloping sides that terminate at a low point, said bracket further comprising a second opening and a second detent on a bottom side of said bracket, said second detent having upwardly sloping sides that terminate at a high point, said second detent adapted for being received by said second crevice when said second protrusion is inserted in said second opening, said second crevice having upwardly sloping sides that terminate at a high point, wherein when said first and second detent receive said first and second crevice, respectively, said hanger is maintained in an initial position with respect to said bracket unless said hanger is acted upon by a horizontal force sufficient to displace said first and second detents from said first and second crevices and when said horizontal force is sufficient to displace said detents from said crevices said sloping sides of said detents slidably travel along said sloping sides of said crevices and when said horizontal force is removed, the detents slidably travel along said sloping sides to the initial position.

6. The mudflap assembly of claim 5 wherein said hanger further comprises a slot for receiving said mudflap.

7. A method, comprising the steps of:
supporting a mudflap with a hanger;
inserting a substantially cylindrical first end of said hanger into a bracket such that a protrusion on a top side of the hanger fits within an opening in a top side of said bracket and a detent having downwardly sloping sides that terminate at a low point on said top side of said bracket is received by a crevice adjacent said protrusion on said top side of said hanger, said crevice having downwardly sloping sides that terminate at a low point;
upon impact of said hanger with an obstacle, rotating said hanger thereby radially displacing said mudflap from an initial position such that said protrusion rotates in said opening and said detent slidably escapes said crevice by moving along said downwardly sloping sides of said crevice; and
when said impact is removed, radially replacing the hanger to the initial position wherein said detent slidably moves along said downwardly sloping sides of said crevice and rests within said crevice.

8. The method of claim 7, further comprising the step of urging said hanger to return to said initial position after said hanger has been acted on by a horizontal force.

9. A mudflap assembly comprising
a hanger for supporting a mudflap, said hanger comprising, at a first end, a protrusion on a top side of said hanger and a crevice on said top side of said hanger positioned adjacent said protrusion, said crevice having downwardly sloping sides that terminate at a low point;
a bracket rotatably coupled to said hanger at said first end of said hanger, said bracket comprising an opening on a top side of said bracket and a detent positioned adjacent said opening, said opening adapted for receiving said protrusion and said detent having downwardly sloping sides that terminate at a low point adapted for being received by said crevice.

10. The mudflap assembly of claim 9, wherein said top side and a bottom side of said bracket form a cavity for receiving said first end of said hanger.

11. The mudflap assembly of claim 9 wherein said hanger further comprises a slot for receiving a mudflap.

* * * * *